United States Patent
Bruno

(10) Patent No.: US 8,264,517 B2
(45) Date of Patent: Sep. 11, 2012

(54) METHOD AND A DEVICE FOR CONTROLLING THE MOVEMENT OF A LINE OF SIGHT, A VIDEOCONFERENCING SYSTEM, A TERMINAL AND A PROGRAM FOR IMPLEMENTING SAID METHOD

(75) Inventor: Adrien Bruno, Grasse (FR)

(73) Assignee: France Telecom, Paris (FR)

( * ) Notice: Subject to any disclaimer, the term of this patent is extended or adjusted under 35 U.S.C. 154(b) by 1316 days.

(21) Appl. No.: 11/916,324

(22) PCT Filed: Jun. 2, 2006

(86) PCT No.: PCT/FR2006/001257
§ 371 (c)(1),
(2), (4) Date: Dec. 3, 2007

(87) PCT Pub. No.: WO2006/129023
PCT Pub. Date: Dec. 7, 2006

(65) Prior Publication Data
US 2010/0194849 A1    Aug. 5, 2010

(30) Foreign Application Priority Data
Jun. 3, 2005   (FR) ...................................... 05 05656

(51) Int. Cl.
*H04N 7/14* (2006.01)

(52) U.S. Cl. ................ 348/14.02; 348/14.16; 348/14.01
(58) Field of Classification Search .... 348/14.01–14.16, 348/169, 207.99
See application file for complete search history.

(56) References Cited

U.S. PATENT DOCUMENTS

| 5,594,494 A * | 1/1997 | Okada et al. ................. 348/14.1 |
| 6,532,447 B1 * | 3/2003 | Christensson ................ 704/275 |
| 6,731,334 B1 * | 5/2004 | Maeng et al. ............ 348/211.12 |
| 2003/0090564 A1 | 5/2003 | Strubbe |
| 2004/0008264 A1 * | 1/2004 | Nister ...................... 348/207.99 |
| 2004/0189851 A1 * | 9/2004 | Son et al. ...................... 348/335 |

FOREIGN PATENT DOCUMENTS

EP   0 884 905   12/1998

* cited by examiner

*Primary Examiner* — Melur Ramakrishnaiah
(74) *Attorney, Agent, or Firm* — Young & Thompson

(57) ABSTRACT

A method of controlling movement of a line of sight of a video camera mounted on a mobile videoconferencing terminal includes: a) a step (72) of using at least two microphones spaced apart from each other in three dimensions and attached to the mobile terminal to pick up a sound uttered by a user of the mobile terminal, b) a step (74) of responding to the signals from the microphones to establish a direction in which the mouth of the user is located, and c) a step (76) of controlling movement of the line of sight as a function of the direction established during step b).

14 Claims, 3 Drawing Sheets

METHOD AND A DEVICE FOR CONTROLLING THE MOVEMENT OF A LINE OF SIGHT, A VIDEOCONFERENCING SYSTEM, A TERMINAL AND A PROGRAM FOR IMPLEMENTING SAID METHOD

The present invention relates to a method and to a device for controlling movement of a line of sight, to a videoconferencing system, to a terminal, and to a program for implementing the method.

BACKGROUND OF THE INVENTION

There exist methods for controlling movement of a line of sight of a video camera mounted on a mobile videoconferencing terminal. For example, one existing method determines the position of a target area in the image captured by the video camera and then controls the movement of the line of sight of the video camera as a function of the position so determined so that the line of sight tracks the target area, which is typically the face of the user of the mobile videoconferencing terminal. In this situation, the face of the user is always at the center of the image.

However, the target area can leave the frame of the captured image in the event of sudden movement of the mobile terminal or of the user. It is then no longer possible to control movement of the line of sight.

SUMMARY OF THE INVENTION

The invention aims to remedy that drawback by proposing another method of controlling movement of the line of sight enabling it to be directed automatically toward the face of the user.

The invention therefore consists in a control method of the above kind comprising:
 a) a step of using at least two microphones spaced apart from each other in three dimensions and attached to the mobile terminal to pick up a sound uttered by a user of the mobile terminal;
 b) a step of responding to the signals from the microphones to establish a direction in which the mouth of the user is located; and
 c) a step of controlling movement of the line of sight as a function of the direction established during step b).

The above control method requires no analysis of the captured image and can function even if the mobile terminal and the user are moving quickly relative to each other.

Implementations of the above control method can have one or more of the following features:
 d) a step of comparing sounds picked up by the microphones during step a) to predefined expressions in natural language associated with command instructions of the mobile terminal, and e) if the sounds picked up and compared correspond to a predefined expression, a step of executing each command instruction associated with that predefined expression;
 f) a step of determining the position of a target area in an image captured by the video camera, a step g) of controlling movement of the line of sight as a function of the position determined in step f) so that the target area moves toward the center of the image captured by the camera, and steps a) to c) are executed automatically if the position of the target area cannot be determined during step f);

step c) or g) controls a motor for moving a lens of the video camera having an optical axis that forms the line of sight; and
 step c) or g) selects only images captured by one or more fixed lenses of the video camera to obtain an image corresponding to that which would be captured by a video camera lens having an optical axis that would coincide with the line of sight.

These implementations of the control method have the following advantages:
 using the same sounds picked up by the microphones to control the movement of the line of sight and also another function of the terminal, enables the user to trigger the execution of two different tasks using the same vocal expression, which facilitates use of the terminal;
 controlling the movement of the line of sight of the video camera as a function of a sound uttered by the user of the mobile terminal alleviates the inoperability of another control method based on tracking a target area.

The invention also consists in a control device for controlling movement of a line of sight of a video camera mounted on a mobile videoconferencing terminal. This control device includes:
 at least two microphones spaced apart from each other in space and attached to the mobile terminal for picking up sounds uttered by a user of the mobile terminal;
 a module for responding to the signals from the microphones to establish a direction in which the mouth of the user is located; and
 a module for controlling movement of the line of sight as a function of the direction established by the module for responding to the signals from the microphones to establish a direction in which the mouth of the user is located.

Embodiments of the above control device can have the following feature:
 a voice recognition module for comparing sounds picked up by the microphones to predefined expressions in natural language associated with command instructions of the mobile terminal and for triggering execution by the mobile terminal of command instructions associated with a predefined expression if the sounds picked up correspond to that predefined expression.

The invention further consists in a videoconferencing system including:
 first and second mobile videoconferencing terminals adapted to exchange videoconference data information via a transmission network and each equipped with at least one video camera having a line of sight that can be moved under control, this system including a device for controlling movement of the line of sight of one of the video cameras on the first or second terminal.

The invention further consists in a mobile videoconferencing terminal equipped with the above control device.

The invention further consists in a computer program for implementing the above control method.

BRIEF DESCRIPTION OF THE DRAWINGS

The invention can be better understood on reading the following description, given by way of example only and with reference to the drawings, in which.

DETAILED DESCRIPTION OF THE PREFERRED EMBODIMENTS

Figure 1:
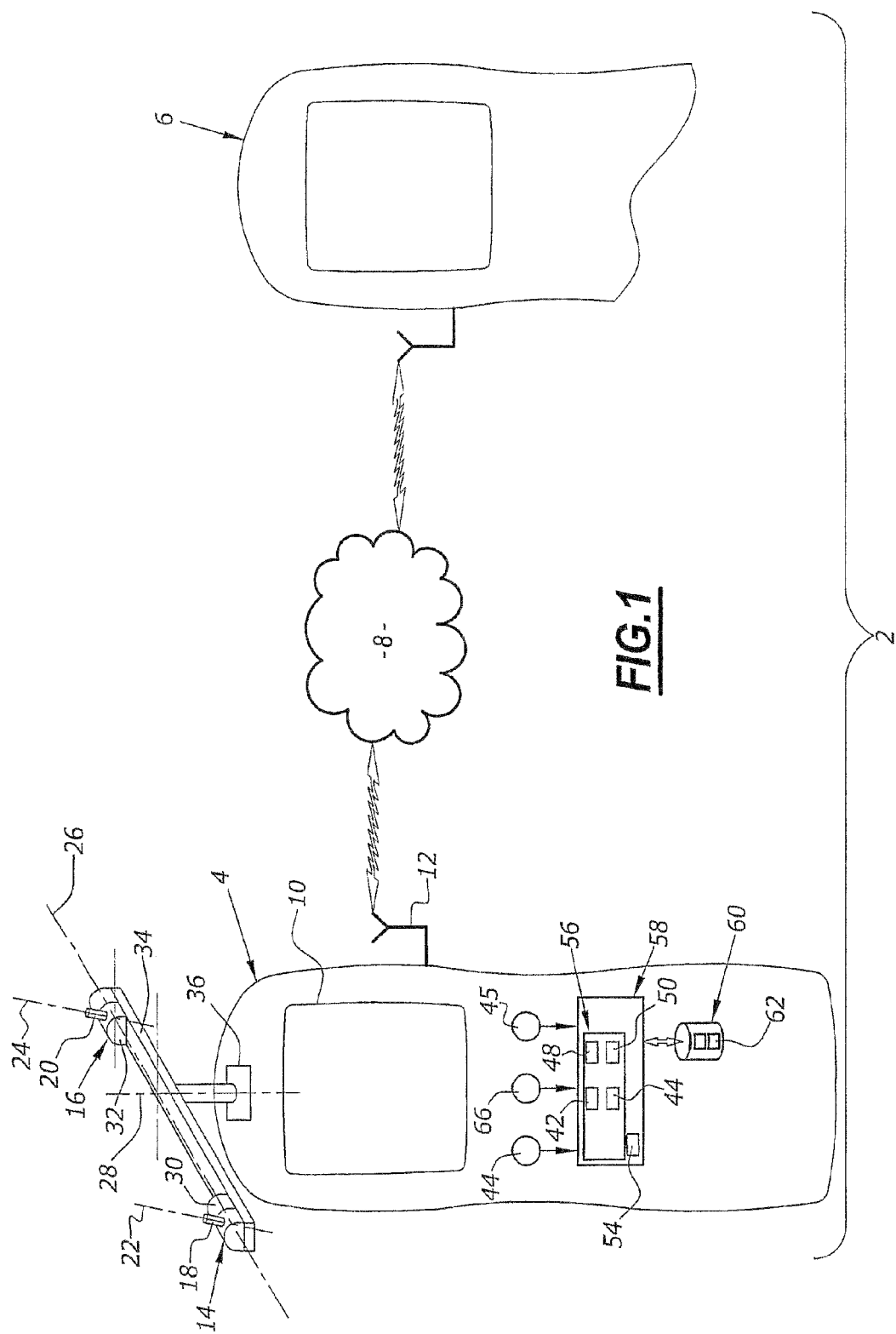
FIG. 1 is a diagrammatic illustration of a videoconferencing system.

FIG. 1 represents a videoconferencing system 2 linking two mobile videoconferencing terminals 4 and 6 via an information transmission network 8.

The network 8 is a GSM (Global System for Mobile communication), a GPRS (General Packet Radio Services), a UMTS (Universal Mobile Telecommunication System) network, or a WiFi network (wireless local area network), for example.

To simplify the description, the terminals 4 and 6 are considered to be identical and only the terminal 4 is described in detail.

The terminal 4 exchanges videoconference data with the terminal 6 via the network 8. Here the terminal 4 is a mobile telephone equipped with a touch-screen 10 and an antenna 12.

Only the elements of the terminal 4 necessary for understanding the invention are described in detail here.

The terminal 4 is equipped with two video cameras 14 and 16 for capturing the face of the user of the terminal 4. The video cameras 14, 16 comprise respective lenses 18 and 20. The optical axes of the lenses 18 and 20 form the respective lines of sight 22 and 24 of the video cameras 14 and 16.

The lenses 18, 20 are rotatable about two orthogonal axes 26 and 28 to move the lines of sight 22, 24. The axes 26 and 28 are fixed relative to the terminal 4.

The lenses 18, 20 are rotated about the axis 26 by respective motors 30 and 32.

The video cameras 14 and 16 and the motors 30 and 32 are mounted on a beam 34 turning about the axis 28.

The terminal 4 includes a motor 36 for turning the beam 34 about the axis 28.

The movement of the lenses 18, 20 is controlled so that each of the lenses captures the same object from a point of view spaced apart in space from that of the other lens, so that a three-dimensional image can be constructed from the two images captured.

The terminal 4 also includes a device for controlling movement of the lines of sight 22 and 24. This control device includes in particular:

a module 42 for determining the position of a target area in the image captured by each of the video cameras;

a module 44 for controlling movement of the lines of sight 22 and 24 as a function of the position determined by the module 42;

a pair of microphones 44, 45 spaced apart in space from each other and each adapted to pick up the voice of the user of the terminal 4;

a module 48 for responding to the signals from the microphones 44, 45 to establish a direction in which the mouth of the user of the terminal 4 is located; and a module 50 for controlling movement of the lines of sight 22 and 24 to align them in the direction established by the module 48.

The terminal 4 also has a voice recognition module 54 for comparing sounds picked up by the microphones 44, 45 to prerecorded expressions in natural language and automatically triggering execution of command instructions by one or both of the terminals 4 and 6.

To be more precise, the module 54 is adapted to pick up automatically if it recognizes in the sounds picked up by the microphones 44 and 45 the predefined expression "hello". The module 54 is also adapted to trigger automatically the dialing of a preselected telephone number if the module 54 recognizes another predefined expression such as "call" in the sounds picked up by the microphones 44 and 45.

The modules 42, 44, 48 and 50 are grouped together in a control unit 56 for the motors 30, 32 and 36 for controlling movement of the lines of sight 22 and 24.

The control unit 56 and the module 54 are implemented in an electronic computer 58 of the terminal 4. The computer 58 is a programmable computer adapted to execute a computer program including code instructions for implementing the FIG. 2 method. The computer program is stored in a memory 60 connected to the computer 58, for example. The memory 60 also holds a dictionary 62 containing the predefined expressions in natural language recognizable by the module 54 and the command instructions of the terminal 4 or 6 associated with each of the predefined expressions.

Finally, the control device of the terminal 4 includes a button 66 that can be operated by the user of the terminal 4. This button 66 is connected to the computer 58 and is used to send the terminal 6 a command for manual activation of the modules 48 and 50 of the terminal 6.

Figure 2:
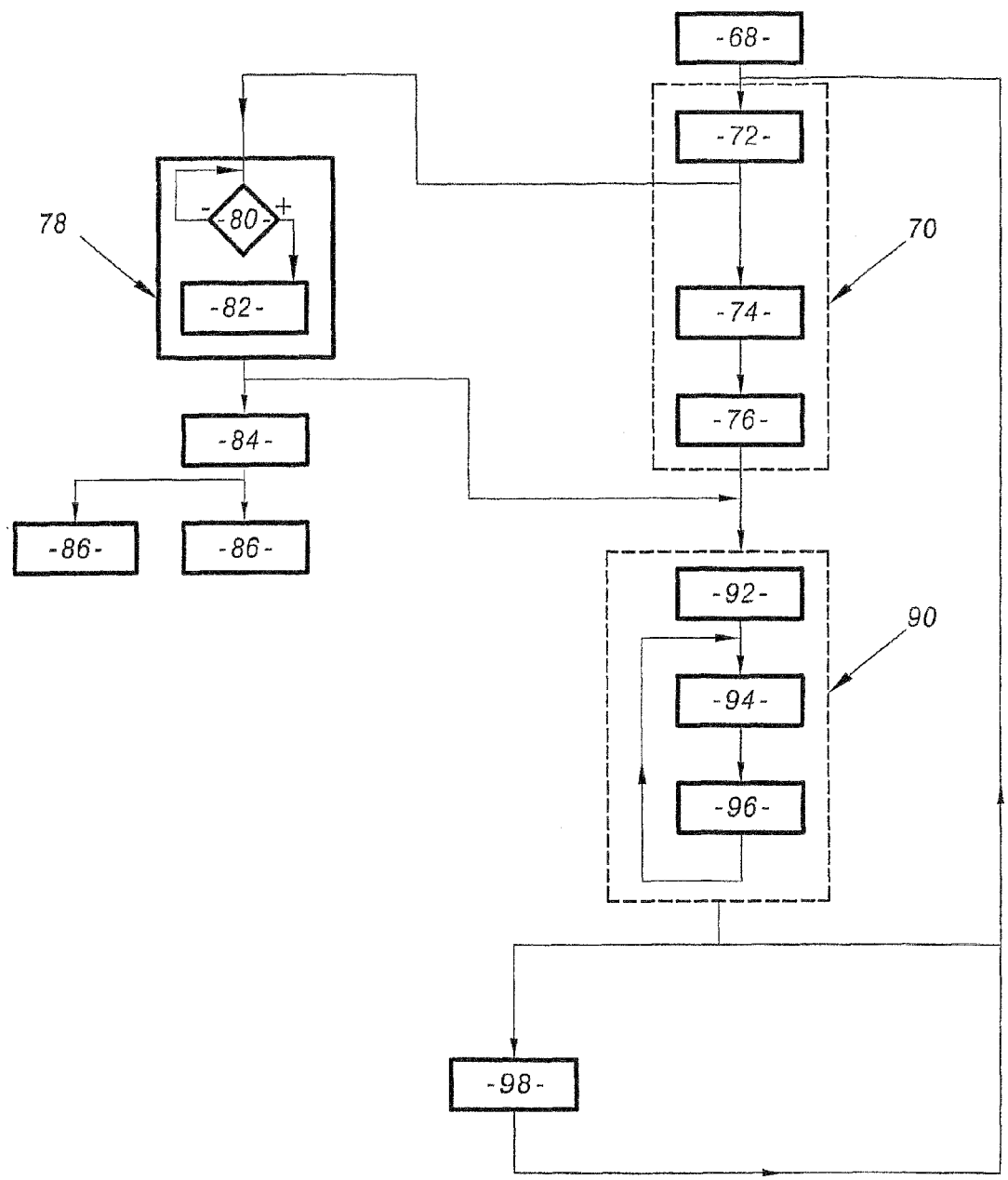
FIG. 2 is a flowchart of a videoconferencing method used in the system of FIG. 1.

The operation of the system 2 is described below with reference to the FIG. 2 method with particular reference to the terminal 4.

At the start of the process, during a step 68, the user of the terminal 4 enters or selects a telephone number and then says "call".

The terminal 4 then proceeds automatically to a stage 70 of orienting the lines of sight 22, 24 toward the voice.

At the beginning of the stage 70, during a step 72, the microphones 44 and 45 pick up sounds uttered by the user of the terminal 4. Here those sounds correspond to the expression "call".

Then, during a step 74, the module 48 establishes the direction in which the mouth of the user is located from the sounds picked up during the step 72. This is possible because the microphones 44 and 45 are separated from each other in space, so that as a function of the position of the mouth of the user, sounds uttered by the user do not take the same time to propagate to the microphones 44 and 45, which enables the direction in which the mouth of the user is located to be established.

Once that direction has been established, during a step 76, the module 50 controls the motors 30, 32, and 36 to move the lines of sight 22, 24 to a position in which they are aligned with the direction previously established, the lenses 18, 20 facing the user's mouth.

The stage 70 therefore initially directs the lines of sight 22 and 24 toward the face of the user of the terminal 4.

In parallel with the stage 70, the terminal 4 simultaneously executes a step 78 of voice recognition of command instructions from the same sounds picked up during the step 72.

At the beginning of the step 78, during an operation 80, the voice recognition module 54 compares the sounds picked up by the microphones 44 and 45 to the expressions contained in the dictionaries 62.

If the sounds picked up correspond to one of the expressions from the dictionary 62, the module 54 triggers the execution of command instructions associated with the recognized predefined expression, during an operation 82. For example, the expression "call" is recognized here and so during the operation 82 the terminal 4 automatically dials the number entered or selected during the step 68.

Below in this description, it is assumed that the number entered or selected during the step 68 is that of the terminal 6.

Accordingly, after the step 78, the terminal 6 rings.

To pick up, the user of the terminal 6 says "hello", during a step 84.

The terminal 6 then executes in parallel a stage 86 of orienting the lines of sight of its video cameras toward the voice and a step 88 of voice recognition of the command instruction.

The stage 86 and the step 88 are identical to the stage 70 and the stage 78, respectively, for example. However, note that the expression "hello" stored in the dictionary 62 is associated with command instructions enabling the terminal to seize the line (pick up). Accordingly, following the stage 86 of the step 88, the lines of sight of the terminal 6 are directed toward the face of the user of that terminal and the terminal 6 has seized the line.

After the stage 70 and the step 78, during a stage 90, orientation of the lines of sight 22, 24 is controlled by tracking a target area in the captured image.

By default, the target area corresponds to a face. However, during a step 92, the user of the terminal 6 can select a different target area by touching the touch-screen of the telephone. The characteristics of the target area selected in this way are then sent to the terminal 4, which uses them instead of those stored by default.

The position of this target area is determined automatically by the module 42 during a step 94.

Then, during a step 96, as a function of the position so determined, the module 44 controls the motors 30, 32, and 36 so that the lines of sight 22 and 24 are moved so that they pass through the center of the target area.

The steps 94 and 96 are repeated continuously, to maintain the face of the user of the terminal 4 at the center of the images captured by the video cameras 14 and 16.

The image processing used to determine the position of the target area is slow. Consequently, if the user moves the terminal 4 suddenly or if the user or the user's face moves suddenly, the target area can leave the frame of the images captured by the video cameras 14 and 16 and the step 94 then becomes impossible. The terminal 4 then returns automatically to the stage 70, for example.

The method returns automatically to the stage 90 as soon as the target area is again present in the captured image.

If the target area has left the frame of the captured image, the user of the terminal 6 can also press the button 66 on the terminal, during a step 98, to restart the stage 70 of orienting the lines of sight of the terminal 4 toward the voice.

Figure 3:
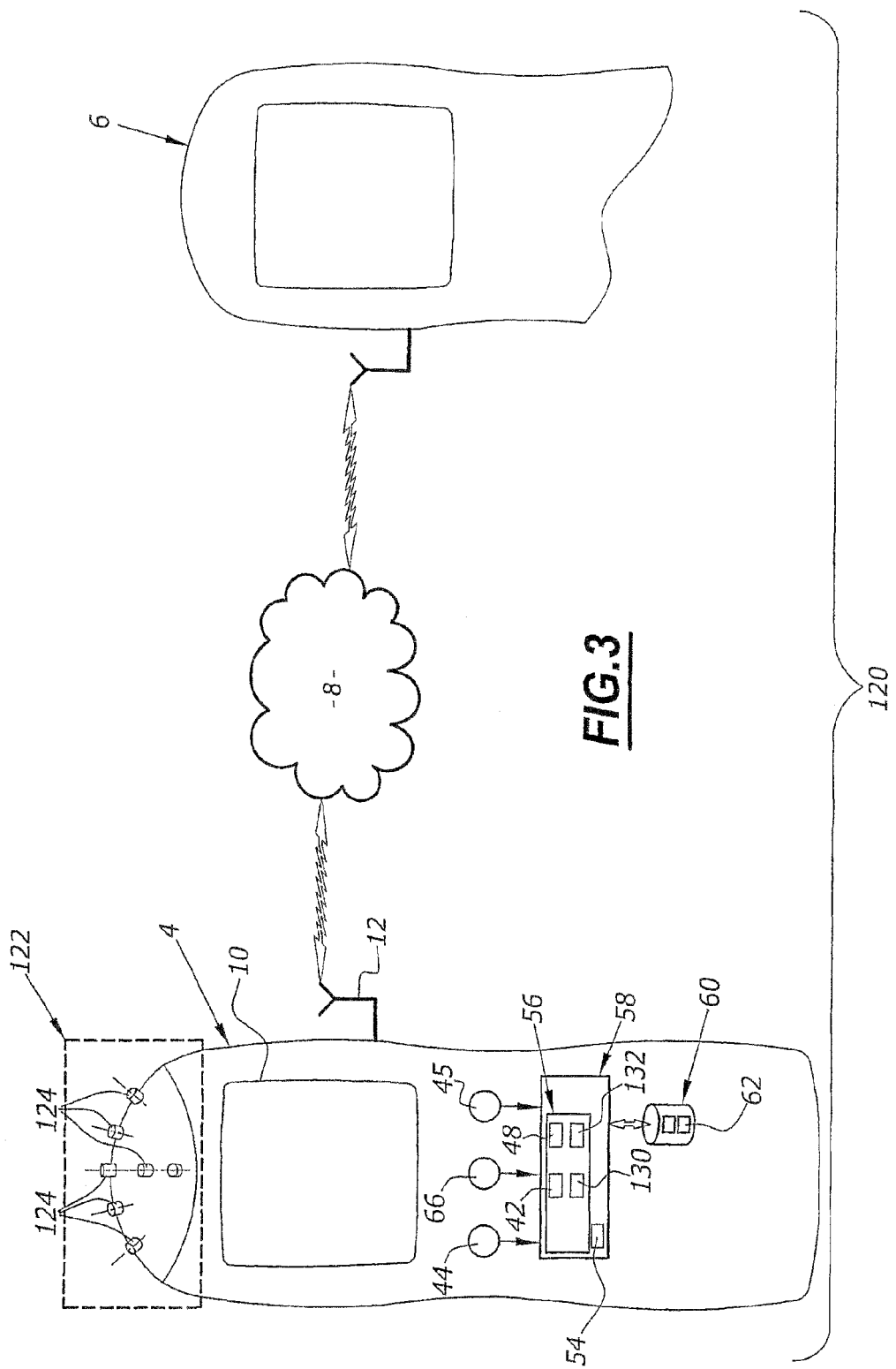
FIG. 3 is a diagrammatic illustration of another embodiment of a videoconferencing system.

FIG. 3 shows another videoconference system 120. This system 120 is identical to the system 2 except that the video cameras 14, 16, the beam 34, and the motors 30, 32, and 36 are replaced by a single video camera 122 with multiple lenses. Elements in FIG. 3 already described with reference to FIG. 2 can carry the same reference numbers.

The video camera 122 has nine lenses 124, for example, corresponding to lines of sight oriented in different directions in space. In FIG. 3, only seven of the nine lenses 124 are visible. These lenses 124 are fixed and are not movable relative to the body of the terminal 4.

The other elements of the terminal 4 are identical to those described with reference to FIG. 1 except for the modules 44 and 50, which are replaced by modules 130 and 132, respectively. These modules 130 and 132 differ from the modules 44 and 50, respectively, in that moving the line of sight of the video camera 122 consists in selecting the lens or lenses 124 closest to the required line of sight and then combining the images captured by the selected lenses to construct an image identical to the image that would have been captured using the required line of sight. Accordingly, in the FIG. 3 embodiment, movement of the line of sight of the video camera is obtained without mechanical movement of the lenses.

Numerous other embodiments of the systems 2 and 120 are possible. For example, the modules 42, 44, 48, 50, and 54 of the device for controlling the movement of the lines of sight 22 and 26 are implemented in the remote terminal, i.e. in the terminal 6, so that movement of those lines of sight is controlled remotely. Only the microphones 44, 45 have to be retained in the terminal 4. The signals picked up by the microphones 44, 45 are then sent to the corresponding modules via the network 8.

If it is not necessary to construct a three-dimensional image, the terminal 4 can be simplified by eliminating one of the video cameras 14 or 16.

In the terminal 4 of the system 120, if the number of lenses 124 is very large and covers with sufficient accuracy virtually all possible line of sight directions, the step of moving the line of sight consists only in selecting the lens having its optical axis closest to the required line of sight.

The systems 2 and 120 are described above in the particular circumstance of the videoconference being established between only two terminals. However, a videoconference can instead be established between more than two mobile terminals.

Moving the line of sight in response to voice can be implemented independently of other means for controlling the movement of the line of sight described here. For example, the stage 90 can be eliminated and the stage 70 repeated several times to maintain the line of sight directed toward the user's face.

The invention claimed is:

1. A method of controlling movement of a line of sight of a video camera mounted on a mobile videoconferencing terminal, the method comprising:
   f) a step of determining a position of a target area in an image captured by the video camera; and
   g) a step of controlling movement of the line of sight as a function of the position determined in step f) so that the target area moves toward a center of the image captured by the camera,
   wherein, upon a determination that the position of the target area cannot be determined during step f),
   a) at least two microphones are used, spaced apart from each other in three dimensions, and attached to the mobile terminal to pick up a sound uttered by a user of the mobile terminal, each of the microphones configured to generate a corresponding signal in response to the sound uttered by the user,
   b) the signals generated by the at least two microphones are responded to in order to establish a direction in which a mouth of the user is located, and
   c) movement of the line of sight is controlled as a function of the direction established during step b).

2. The method according to claim 1, further comprising:
   d) a step of comparing a plurality of sounds picked up by the microphones during step a) to predefined expressions in natural language associated with command instructions of the mobile terminal; and
   e) if the plurality of sounds picked up and compared correspond to a predefined expression, a step of executing each command instruction associated with said predefined expression.

3. The method according to claim 1, wherein at least one of steps c) and g) controls a motor for moving a lens of the video camera having an optical axis that forms the line of sight.

4. The method according to claim 1, wherein at least one of steps step c) and g) selects only images captured by one or more fixed lenses of the video camera to obtain an image corresponding to that which would be captured by a video camera lens having an optical axis that would coincide with the line of sight.

5. A device for controlling movement of a line of sight of a video camera mounted on a videoconferencing mobile terminal, comprising:

at least two microphones spaced apart from each other in space and attached to the mobile terminal for picking up sounds uttered by a user of the mobile terminal;

a module for responding to the signals from the microphones to establish a direction in which the mouth of the user is located;

a module for controlling movement of the line of sight as a function of the direction established by the module for responding to the signals from the microphones to establish a direction in which the mouth of the user is located;

a module (42) for determining a position of a target area in an image captured by the video camera; and a module (44) for controlling movement of the line of sight as a function of the position determined by the module (42) for determining the position of a target area.

6. A device according to claim 5, further comprising:

a voice recognition module (54) for comparing sounds picked up by the microphones to predefined expressions in natural language associated with command instructions of the mobile terminal and for triggering execution by the mobile terminal of command instructions associated with a predefined expression if the sounds picked up and compared correspond to that predefined expression.

7. A videoconferencing system, comprising:

first and second mobile videoconferencing terminals adapted to exchange videoconference data information via a transmission network and each equipped with at least one video camera having a line of sight that can be moved under control; and a device according to claim 5 for controlling movement of the line of sight of one of the video cameras on the first or second terminal.

8. A mobile videoconferencing terminal, comprising:

a device according to claim 5 for controlling movement of a line of sight.

9. A computer program recorded on a non-transitory computer-readable medium, the computer program comprising:

instructions that, upon being run a computer, causes the computer to execute a control method according to claim 1.

10. A videoconferencing system, including:

first and second mobile videoconferencing terminals adapted to exchange videoconference data information via a transmission network and each equipped with at least one video camera having a line of sight that can be moved under control; and a device according to claim 6 for controlling movement of the line of sight of one of the video cameras on the first or second terminal.

11. A mobile videoconferencing terminal, comprising:

a device according to claim 6 for controlling movement of a line of sight.

12. A computer program recorded on a non-transitory computer-readable medium, the computer program comprising:

instructions that, upon being run a computer, causes the computer to execute a control method according to claim 2.

13. A computer program recorded on a non-transitory computer-readable medium, the computer program comprising:

instructions that, upon being run a computer, causes the computer to execute a control method according to claim 3.

14. A computer program recorded on a non-transitory computer-readable medium, the computer program comprising:

instructions that, upon being run a computer, causes the computer to execute a control method according to claim 4.

* * * * *